US012148397B2

(12) United States Patent
Jang

(10) Patent No.: US 12,148,397 B2
(45) Date of Patent: Nov. 19, 2024

(54) DISPLAY DEVICE AND OPERATION METHOD THEREFOR

(71) Applicant: LG ELECTRONICS INC., Seoul (KR)

(72) Inventor: Eunkwang Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/550,357

(22) PCT Filed: Dec. 14, 2021

(86) PCT No.: PCT/KR2021/018928
§ 371 (c)(1),
(2) Date: Sep. 13, 2023

(87) PCT Pub. No.: WO2022/231088
PCT Pub. Date: Nov. 3, 2022

(65) Prior Publication Data
US 2024/0169936 A1 May 23, 2024

(30) Foreign Application Priority Data
Apr. 28, 2021 (KR) ........................ 10-2021-0054962

(51) Int. Cl.
*G09G 3/34* (2006.01)
*G09G 3/20* (2006.01)

(52) U.S. Cl.
CPC ......... *G09G 3/3406* (2013.01); *G09G 3/2003* (2013.01); *G09G 2300/0842* (2013.01); *G09G 2320/0247* (2013.01); *G09G 2320/0626* (2013.01); *G09G 2320/0673* (2013.01); *G09G 2360/16* (2013.01)

(58) Field of Classification Search
None
See application file for complete search history.

(56) References Cited

U.S. PATENT DOCUMENTS

2010/0156965 A1* 6/2010 Kim ..................... G09G 3/3688 345/691
2018/0053462 A1* 2/2018 Bae ...................... G09G 3/2074
2020/0152111 A1* 5/2020 Lim ..................... G09G 3/3648
2023/0245633 A1* 8/2023 Lee ........................ G09G 5/227 345/660
2023/0386378 A1* 11/2023 Zhao ........................ G09G 3/20

FOREIGN PATENT DOCUMENTS

JP 2010187192 8/2010
KR 1020040103549 12/2004
KR 1020070076078 7/2007
KR 1020090050229 5/2009
KR 1020200053365 5/2020

OTHER PUBLICATIONS

PCT International Application No. PCT/KR2021/018928, International Search Report dated Aug. 3, 2022, 2 pages.

* cited by examiner

*Primary Examiner* — Matthew Yeung
(74) *Attorney, Agent, or Firm* — LEE, HONG, DEGERMAN, KANG & WAIMEY

(57) ABSTRACT

An object of the present disclosure is to improve flicker by reducing a luminance change according to a change in an image frequency during a variable refresh rate (VRR) operation.

14 Claims, 8 Drawing Sheets

FIG. 7
700
Vfrontvrr(max)
| Resolution | Vfreq. | Htotal | Vtotal | Fclk(MHz) | MVRR |
|---|---|---|---|---|---|
| 1920x1080p | 60 | 2200 | 1125 | 148.5 | 290 |
| | 120 | 2200 | 1125 | 297 | 1705 |
| 3840x2161p | 60 | 4400 | 2250 | 594 | 580 |
| | 120 | 4400 | 2250 | 1188 | 3409 |
FIG. 8
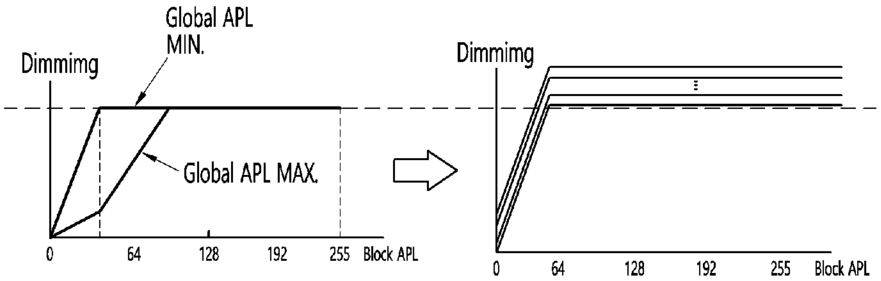
FIG. 9
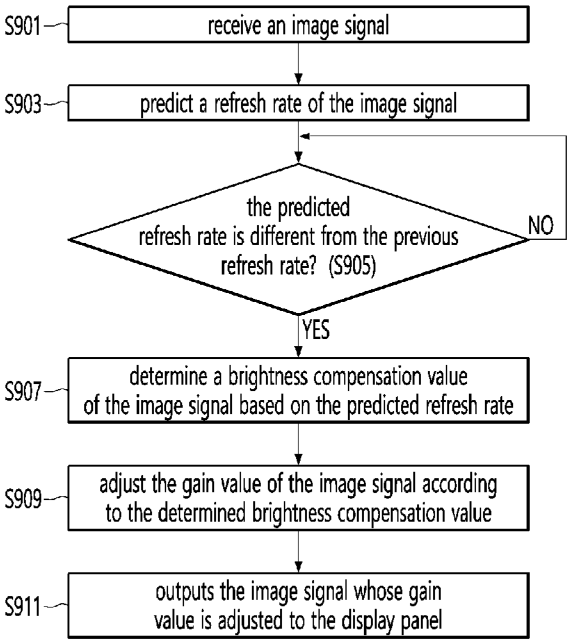

1000

FIG. 10 compensation value

| | 1920x1080@100p | 1920x1080@120p | 2560x1440@120p | 3840x2160@100p | 3840x2160@120p | HDR OFF | HDR ON |
|---|---|---|---|---|---|---|---|
| 48 | 1224 | 1672 | 2291 | 2446 | 3383 | 56 | 62 |
| 49 | 1176 | 1635 | 2236 | 2350 | 3260 | | |
| 50 | 1130 | 1579 | 2161 | 2258 | 3158 | | |
| 51 | 1086 | 1527 | 2088 | 2170 | 3053 | | |
| 52 | 1044 | 1476 | 2019 | 2085 | 2951 | | |
| 53 | 1002 | 1427 | 1952 | 2004 | 2853 | 55 | 60 |
| 54 | 964 | 1379 | 1888 | 1925 | 2758 | | |
| 55 | 926 | 1334 | 1826 | 1840 | 2668 | | |
| 56 | 888 | 1290 | 1766 | 1776 | 2580 | | |
| 57 | 854 | 1243 | 1708 | 1706 | 2425 | | |
| 58 | 820 | 1207 | 1653 | 1638 | 2414 | | |
| 59 | 786 | 1168 | 1599 | 1572 | 2335 | | |
| 60 | 754 | 1129 | 1547 | 1508 | 2258 | | |
| 61 | 724 | 1073 | 1477 | 1447 | 2185 | 54 | 58 |
| 62 | 694 | 1057 | 1443 | 1388 | 2113 | | |
| 63 | 666 | 1022 | 1401 | 1330 | 2044 | | |
| 64 | 638 | 980 | 1355 | 1274 | 1977 | | |
| 65 | 610 | 956 | 1311 | 1220 | 1912 | | |
| 66 | 584 | 925 | 1268 | 1168 | 1847 | | |
| 67 | 560 | 894 | 1226 | 1117 | 1788 | | |
| 68 | 534 | 855 | 1186 | 1067 | 1729 | | |
| 69 | 510 | 836 | 1147 | 1019 | 1672 | | 56 |
| 70 | 488 | 808 | 1109 | 973 | 1616 | | |
| 71 | 464 | 781 | 1071 | 883 | 1561 | | |
| 72 | 442 | 754 | 1035 | 833 | 1508 | | |
| 73 | 422 | 729 | 1000 | 841 | 1457 | 53 | |
| 74 | 400 | 704 | 966 | 799 | 1407 | | |
| 75 | 390 | 679 | 933 | 758 | 1358 | | |
| 76 | 360 | 656 | 901 | 719 | 1311 | | |
| 77 | 342 | 633 | 888 | 681 | 1265 | | 55 |
| 78 | 322 | 610 | 839 | 643 | 1220 | | |
| 79 | 304 | 588 | 800 | 607 | 1176 | | |
| 80 | 285 | 567 | 780 | 571 | 1133 | | |

1600

| | 1920x1080@100p | 1920x1080@120p | Brightness compensation value | Contrast compensation value |
|---|---|---|---|---|
| 48 | 1224 | 1622 | 56 | 1 |
| 49 | 1176 | 1635 | 55 | 2 |
| 50 | 1130 | 1579 | 55 | 2 |
| 51 | 1035 | 1527 | 55 | 2 |
| ... | ... | ... | ... | ... |

DISPLAY DEVICE AND OPERATION METHOD THEREFOR

CROSS-REFERENCE TO RELATED APPLICATION

This application is the National Stage filing under 35 U.S.C. 371 of International Application No. PCT/KR2021/018928, filed on Dec. 14, 2021, which claims the benefit of earlier filing date and right of priority to Korean Application No. 10-2021-0054962, filed Apr. 28, 2021, the contents of which are all incorporated by reference herein in their entirety.

TECHNICAL FIELD

The present disclosure relates to a display device and an operating method thereof, and more particularly, to a display device controlling luminance of a display panel and operating method thereof.

BACKGROUND ART

A display device for reproducing a game video can display more scenes for the same amount of time than a display device operating at a refresh rate of 60 Hz.

A user can feel a much smoother screen as the refresh rate is higher, and a high refresh rate is required in a game that requires a fast response speed.

Also, when playing a game video, a tearing phenomenon in which the screen is displaced horizontally may occur. The tearing phenomenon occurs when an image refresh rate is fixed or when an image frame output from a graphics card and an image frame output from a display panel are not synchronized.

In order to prevent the tearing phenomenon, a variable refresh rate (or Variable Refresh rate, VRR) technology for synchronizing an output frequency of an image frame of a graphics card and a refresh rate of a display panel has emerged.

However, when a variable refresh rate is applied and a low-frequency image signal is input, the charging and holding characteristics of pixel data are deteriorated according to the storage capacitance size of the pixel electrode constituting the display panel, resulting in a decrease in luminance.

As a result, a large change in luminance occurs, which is conspicuous in the form of flicker, which interferes with the user's viewing.

In addition, the conventional liquid crystal display device controls the overall brightness of the screen through a Pulse Width Modulation (PWM) signal, and controls a backlight unit through a local dimming operation through Serial Peripheral Interface (SPI) communication.

Even if the luminance compensation algorithm is applied through PWM control, since the frequency of the input video frame is random, the frequency of the video frame cannot be predicted, so generation and control of the PWM signal for luminance compensation is delayed by several frames.

This causes a rapid luminance change due to a delay in applying the luminance compensation value according to the variable frequency range of the input image frame, resulting in a phenomenon in which flicker becomes more severe.

DISCLOSURE

Technical Problem

An object of the present disclosure is to improve flicker by reducing a luminance change according to a change in an image frequency during a variable refresh rate (VRR) operation.

An object of the present disclosure is to improve flicker by reducing a luminance change according to a change in video frequency during a variable refresh rate (VRR) operation under an HDMI game mode.

An object of the present disclosure is to reduce the occurrence of flicker only by adjusting brightness of an image without adjusting a gamma value during VRR operation.

Technical Solution

A display device according to an embodiment of the present disclosure may comprise: a display panel including a plurality of pixels, a backlight unit configured to provide a light to the display panel and a processor is configured to, when a refresh rate of the image signal is changed, obtain a brightness compensation value suitable for the changed refresh rate, and apply a RGB data value suitable for the obtained brightness compensation value to each pixel, wherein if the brightness compensation value of the image signal is not changed, in a state in which a luminance control value of the backlight unit is fixed, a first luminance change range measured according to the change of the refresh rate is larger than a second luminance change range, if the brightness compensation value of the image signal is changed in a state in which the luminance control value of the backlight unit is fixed, the second luminance change range is measured according to the change of the refresh rate.

wherein each of the first and second luminance change ranges is a difference between a minimum luminance value and a maximum luminance value within a change range of the refresh rate.

A method of operating a display device including a display panel including a plurality of pixels and a backlight unit providing a light to the display panel according to an embodiment of the present disclosure may comprise: receiving an image signal, determining whether a refresh rate of the image signal is changed, obtaining a brightness compensation value suitable for the changed refresh rate when the refresh rate is changed and applying a RGB data value that matches the obtained brightness compensation value to each pixel, wherein if the brightness compensation value of the image signal is not changed, in a state in which a luminance control value of the backlight unit is fixed, a first luminance change range measured according to the change of the refresh rate is larger than a second luminance change range, if the brightness compensation value of the image signal is changed in a state in which the luminance control value of the backlight unit is fixed, the second luminance change range is measured according to the change of the refresh rate.

Advantageous Effects

According to the present disclosure, during a variable refresh rate (VRR) operation, it is possible to minimize the occurrence of flicker by minimizing a luminance change according to a change in a refresh rate of an image frame.

According to the present disclosure, when a game video is played, flicker is suppressed, and the user can watch the game video naturally.

According to an embodiment of the present disclosure, during VRR operation, the occurrence of flicker can be reduced only by adjusting the brightness of an image without adjusting a gamma value.

DESCRIPTION OF DRAWINGS

FIG. 7 is a view for explaining a table showing a correspondence between a resolution, the number of lines of a maximum vertical front porch, and a refresh rate according to an embodiment of the present disclosure.

FIG. 8 is a graph for comparing dimming value control according to a conventional PWM method and dimming value control according to an embodiment of the present disclosure.

FIG. 9 is a flowchart illustrating a method of controlling luminance of a display device according to another exemplary embodiment of the present disclosure.

FIG. 10 is an example of a lookup table showing a correspondence between a brightness compensation value suitable for a refresh rate according to an embodiment of the present disclosure.

BEST MODE

Hereinafter, the present specification will be described in more detail with reference to the drawings.

Figure 1:
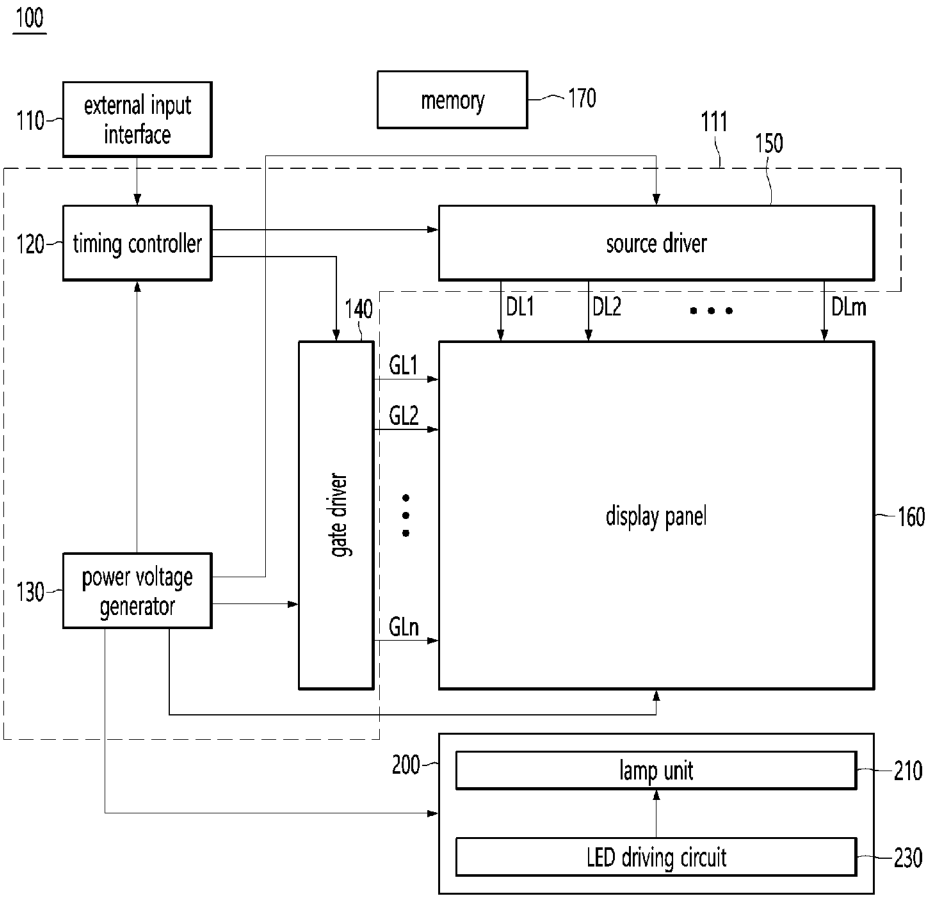
FIG. 1 is a block diagram illustrating a configuration of a display device according to an exemplary embodiment of the present disclosure.

FIG. 1 is a diagram illustrating a display device according to an embodiment of the present disclosure.

The display device 100 of FIG. 1 may be any one of a monitor, a TV, a tablet PC, and a mobile terminal.

The display device 100 may include an external input interface 110, a processor 111, a display panel 160, and a backlight unit 200.

The external input interface 110 may receive image data from an external device.

The external input interface 110 may include one or more HDMI terminals and one or more A/V terminals.

The display panel 160 may be a liquid crystal display panel.

The display panel 160 may display an image based on an image signal input from the external input interface 110.

A plurality of data lines DL1 to DLm and a plurality of gate lines GL1 to GLn are crossed in a matrix form on a substrate using glass and the display panel 160 may include a plurality of pixels corresponding to each intersection.

Each of the plurality of pixels may output an image based on an image signal provided from the source driver 150, a drive signal provided to the gate driver 140, and light provided from the backlight unit 200.

The memory 170 may store program and information necessary for driving the display panel 160.

The backlight unit 200 may provide light to the display panel 160.

The external input interface 110 may receive a control signal including at least one of image data (RGB Data), a clock signal, a horizontal synchronization signal, a vertical synchronization signal, and a data enable signal from an external device.

The horizontal synchronization signal may be a signal for synchronizing the horizontal direction of the screen.

The vertical synchronization signal may be a signal for synchronizing the vertical direction of the screen.

Also, the data enable signal may indicate a period for supplying data to pixel.

The external input interface 110 may be included in the processor 111.

The processor 111 may include a timing controller 120, a power voltage generator 130, a gate driver 140 and a source driver 150.

The timing controller 120 may generate a driving signal for driving the gate driver 140 composed of a plurality of driver integrated circuits and the source driver 150 composed of a plurality of drive integrated circuits using the control signal received from the external input interface 110.

For example, driving signals for driving the gate driver 140 include a high signal, a gate low signal, a clock signal, a start signal, and a reset signal.

The power voltage generator 130 may supply a power voltage, a reference voltage, a ground voltage, and the like necessary for the operation of each component included in the processor 111.

The power voltage generator 130 may supply a common voltage corresponding to the reference voltage to the display panel 160.

The power voltage generator 130 may supply DC power (LED B+) necessary for driving the backlight unit 200.

The gate driver 140 may perform on/off control of each of a plurality of pixels included in the display panel 160 in response to a driving signal input from the timing controller 120.

The gate driver 140 may output gate driving signals (Vg1 to Vgn) to sequentially enable the gate lines (GL1 to GLn) on the display panel 160 by one horizontal synchronization time.

Accordingly, image signals supplied from the source driver 150 may be applied to each pixel.

The source driver 150 may apply an image signal to each pixel in response to a data signal input from the timing controller 120 and a driving signal.

The backlight unit 200 may be disposed on one surface of the display panel 160 to provide light to the display panel 160.

The backlight unit 200 may include a lamp unit 210 and an LED driving circuit 230.

The lamp unit 210 may provide light to the display panel 160.

The lamp unit 210 may provide light to the display panel 160 so that the display panel 160 implements a High Dynamic Range (HDR) image under the control of the LED driving circuit 230.

To this end, a local dimming method may be used. Local dimming may be a method of turning on or off lighting in a specific area of the screen.

Local dimming can be used to implement HDR image.

The lamp unit 210 may include a plurality of channels. Each channel may include one or more LED elements connected in series, a dimming circuit and a resistor.

Each LED element may emit monochromatic light of red, green, and blue or emit white light.

The dimming circuit may be a semiconductor switch capable of turning one or more LED elements on or off.

The dimming circuit may be composed of a Field Effect Transistor (FET).

Resistance can be used to measure the current flowing through one channel. The DC voltage supplied from the power supply voltage generator 130 to the lamp unit 210 is dropped through one or more LED elements, and the dropped voltage may be applied to a resistor.

By measuring the voltage across the resistance, the current flowing through the channel can be measured.

A plurality of channels may be connected in parallel and electrically connected to the LED driving circuit 230.

The LED driving circuit 230 may control the operation of the lamp unit 210.

The LED driving circuit 230 may include a plurality of LED drivers.

The number of LED drivers included in the LED driving circuit 230 may be less than the number of channels included in the lamp unit 210.

The number of LED drivers may be equal to the number of dimming circuits. That is, the number of dimming circuits may be less than the number of channels.

Figure 2:
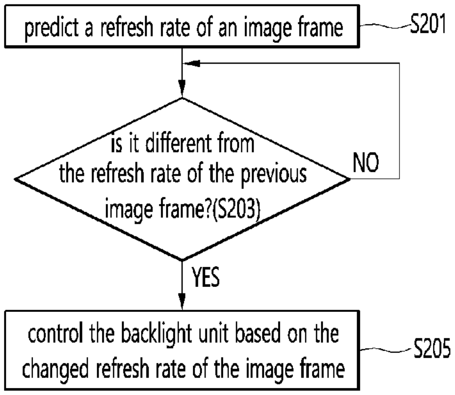
FIG. 2 is a flowchart illustrating a method for controlling luminance of a display device according to an exemplary embodiment of the present disclosure.

FIG. 2 is a flowchart illustrating a method for controlling luminance of a display device according to an exemplary embodiment of the present disclosure.

Hereinafter, frequency may mean a refresh rate of an image frame.

Referring to FIG. 2, the processor 111 of the display device 100 predicts a refresh rate of an image frame (S201).

The external input interface 110 may receive an image signal or image frame from a connected external device.

The external input interface may include one or more High Definition Multimedia Interface (HDMI) terminals or one or more A/V terminals.

An external device connected to the external input interface 110 may output an image frame by changing a frequency. That is, the external input interface 110 may receive an image frame whose frequency changes according to time.

The external device may transmit information indicating that a variable refresh rate is applied to the image frame to the display device 100.

In an embodiment, the processor 111 may predict a refresh rate of an image frame based on an image data packet received through the external input interface 110.

This will be described with reference to the drawing of FIG. 3.

Figure 3:
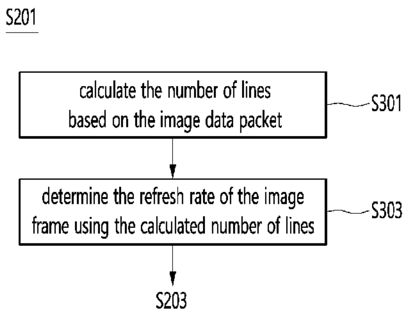
FIG. 3 is a flowchart illustrating a method of predicting a refresh rate of an image frame according to an exemplary embodiment of the present disclosure.

FIG. 3 is a flowchart illustrating a method of predicting a refresh rate of an image frame according to an exemplary embodiment of the present disclosure.

The processor 111 of the display device 100 calculates the number of lines based on the image data packet received from the external input interface 110 (S301).

When a variable refresh rate is applied, an image data packet may include information indicating a change in refresh rate.

This will be described with reference to the following drawings.

Figure 4:
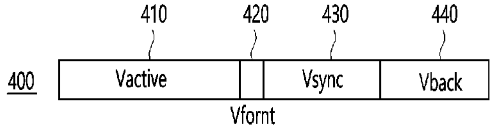
FIG. 4 is a diagram for explaining the structure of an image data packet to which a variable refresh rate is not applied.
Figure 5:
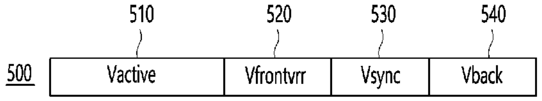
FIG. 5 is a diagram to explain the structure of an image data packet to which a variable refresh rate is applied.
Figure 6:
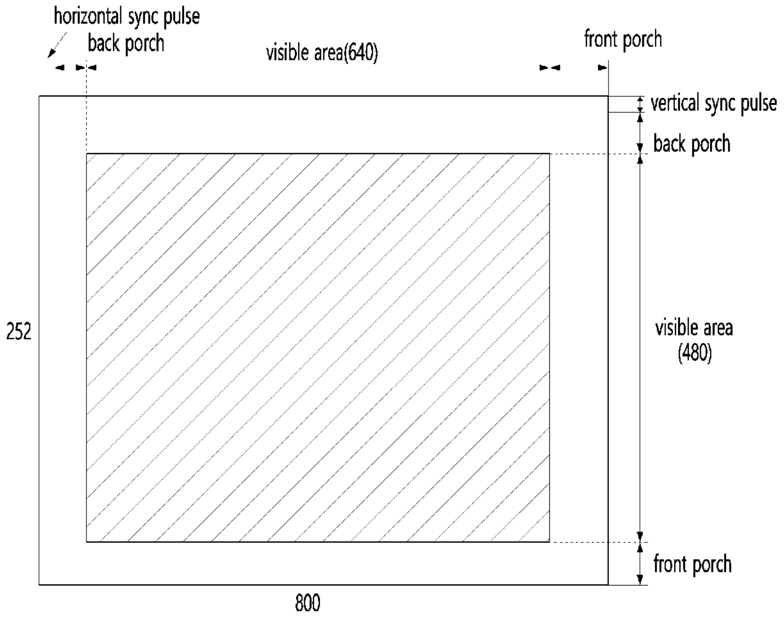
FIG. 6 is a drawing explaining the concept of a display panel having a resolution of 640×480.

FIG. 4 is a diagram for explaining the structure of an image data packet to which a variable refresh rate is not applied, FIG. 5 is a diagram to explain the structure of an image data packet to which a variable refresh rate is applied, and FIG. 6 is a drawing explaining the concept of a display panel having a resolution of 640×480.

First, referring to FIG. 4, the first vertical image data packet 400 includes a vertical active porch 410, a vertical front porch 420, and a vertical sync porch 430. And it may include a vertical back porch (Vertical back porch, 440).

The first image data packet 400 of FIG. 4 may have a structure of an image data packet to which a variable refresh rate is not applied.

The vertical active porch 410 may be a section including data for an actual image displayed on the screen.

The front porch 420 may be a section representing a standby time after a vertical signal is output. The vertical signal may be a signal corresponding to the vertical active porch 410.

The vertical sync porch 430 may be a section for synchronizing vertical signal.

The vertical back porch 440 may be a section indicating a standby time for outputting a vertical signal until outputting the next vertical signal.

The sum of the vertical front porch 420, the vertical sync porch 430, and the vertical back porch 440 may be referred to as a vertical blank porch.

That is, the first image data packet 400 may be the sum of the vertical active porch and the vertical blank porch.

When the variable refresh rate is not applied, the section of the vertical front porch 420 of the first image data packet 400 may be fixed.

Next, the structure of the second image data packet 500 to which the variable refresh rate is applied will be described.

The second image data packet 500 may include a vertical active porch 510, a vertical front porch 520, a vertical sync porch 530, and a vertical back porch 540.

The sum of the vertical front porch 520, the vertical sync porch 530, and the vertical back porch 540 may be referred to as a vertical blank porch.

That is, the second image data packet 500 may be the sum of the vertical active porch and the vertical blank porch.

The vertical active porch 510 may be a section including data for an actual image displayed on the screen.

The front porch 520 may be a section representing a standby time after a vertical signal is output. The vertical signal may be a signal corresponding to the vertical active porch 510.

The vertical sync porch 530 may be a section for synchronizing vertical signal.

The vertical back porch 540 may be a section indicating a standby time for outputting a vertical signal until outputting the next vertical signal.

Referring to FIG. 6, an area where an actual image is displayed may be an area corresponding to 640×480, and an area to which a scan signal is applied may be an area corresponding to 800×525. An area in which an actual image is not displayed may be a porch portion.

When a variable refresh rate is applied, the section of the vertical front porch 520 of the second image data packet 500 may be changed. That is, the value of the vertical front porch 520 of the image data packet 500 input through the external input interface 110 may be changed in real time.

The value of the vertical front porch 520 may be the number of lines of the horizontal synchronization signal input on the vertical front porch 520.

The processor 111 may determine the refresh rate of the second image data packet 500 based on the change of the vertical front porch 520 of the second image data packet 500.

The processor 111 may count the value of the vertical front porch 520. To this end, the processor 111 may include a separate counter.

The processor 111 may calculate the value of the vertical front porch 520 and determine the refresh rate of the image frame based on the calculated number of lines.

The processor 111 may count the number of vertical front porches 520 and calculate a synchronization value based on the input falling edge of the horizontal synchronization signal and the vertical synchronization signal.

The processor 111 may determine a refresh rate of the second image data packet 500 based on a change in the vertical blank porch of the second image data packet 500.

Since the vertical blank porch is the sum of the vertical front porch 520, the vertical sync porch 530, and the vertical back porch 540, when the vertical sync porch 530 and the vertical back porch 540 are fixed, respectively, it can be changed according to the change of the vertical front porch 520.

The processor 111 may determine the refresh rate of the second image data packet 500 by using the value of the vertical blank porch of the second image data packet 500.

The processor 111 of the display device 100 determines the refresh rate of the image frame using the calculated number of lines (S303).

The processor 111 may determine the refresh rate of the image frame based on a table showing a correspondence between the number of lines of the vertical blank porch 520 and the refresh rate.

This will be described with reference to FIG. 7.

FIG. 7 is a view for explaining a table showing a correspondence between a resolution, the number of lines of a maximum vertical front porch, and a refresh rate according to an embodiment of the present disclosure.

Referring to FIG. 7, A table 700 indicating correspondence between resolution, vertical frequency (corresponding to refresh rate), horizontal total porch (Htotal), vertical total porch (Vtotal), clock frequency (Fclk), and maximum vertical front porch value (number of lines) is shown.

Table 700 may be stored in memory 170.

The table 700 may define values of MVRR corresponding to supported representative resolutions.

The maximum vertical front porch MVRR may be the maximum value of the vertical front porch 520.

The value of the maximum vertical front porch (MVRR) may be calculated through Equation 1 below.

$$M_{MAX}=\text{CEILING}(f_{Clock}/(\text{Htotal}\times VRR_{MIN}\times 0.994)-\text{Vtotal}\times FVA\_\text{Factor}) \quad \text{[Equation 1]}$$

The processor 111 may receive the resolution of an image frame from an external device through the external input interface 110.

The processor 111 may determine the refresh rate of the image frame using the value (number of lines) of the vertical front porch 520 obtained in step S301 and the table 700.

When the resolution is 1920×1080, the scan signal can be scanned in an area of 2200×1125, and when the resolution is 3840×2160, the scan signal can be scanned in an area of 4400×2250.

The resolution may be information contained in the vertical back porch.

When the number of lines of the vertical front porch 520 with the obtained resolution from the external device is calculated, the processor 111 may search the table 700 for a vertical frequency that matches the number of lines calculated.

For example, when the resolution is 1920×1080 and the number of lines of the vertical front porch is 290 or less, the processor 111 may determine the refresh rate of the image frame to be 60 Hz.

Also, when the resolution is 1920×1080 and the number of lines of the vertical front porch is 1705 or less, the processor 111 may determine the refresh rate of the image frame to be 120 Hz.

Also, when the resolution is 3840×2160 and the number of lines of the vertical front porch is 580 or less, the processor 111 may determine the refresh rate of the image frame to be 60 Hz.

Also, when the resolution is 3840×2160 and the number of lines of the vertical front porch is 3409 or less, the processor 111 may determine the refresh rate of the image frame to be 120 Hz.

As described above, according to an exemplary embodiment of the present disclosure, the refresh rate of an image frame may be predicted by calculating the number of lines of the vertical front porch.

Again, FIG. 2 is described.

The processor 111 of the display device 100 determines whether the refresh rate of the predicted image frame is different from the refresh rate of the previous image frame (S203).

The external device may change and output the frequency of the image frame in real time under the game mode.

In the case of game image in which screen is switched quickly, screen tearing may occur. Tearing is a phenomenon in which, when the frame rate of the graphic card exceeds the refresh rate of the display panel, several frames are overlapped in one scan because synchronization is not achieved.

In order to prevent tearing, a variable refresh rate (VRR) method may be used to synchronize the refresh rate of the display panel with the change in the frame rate of the graphic card.

Due to this variable refresh rate method, the frequency of an image frame can be changed in real time.

The processor 111 may store the refresh rate of the previously input image frame in the memory 170.

The processor 111 may determine whether the refresh rate of the previously input image frame and the predicted refresh rate of the image frame are the same.

When the refresh rate of the predicted image frame is different from that of the previous image frame, the processor 111 of the display device 100 controls the backlight unit 200 based on the changed refresh rate of the image frame (S205).

The local dimming method may be a method of controlling the brightness of the light sources of the backlight unit for each block by dividing the liquid crystal display panel according to the virtual blocks divided in matrix form, deriving the representative value of the input image data for each block, and adjusting a dimming intensity (dimming value) of each block according to the representative value for each block.

The processor 111 may determine a dimming intensity of the backlight unit 200 suitable for the refresh rate of the changed image frame, and control the backlight unit 200 to output light with the determined dimming intensity.

The dimming intensity may be the intensity of light output from each of a plurality of blocks constituting the backlight unit 200.

When the backlight unit 200 is composed of a plurality of blocks, the dimming intensity of each block may be adjusted differently.

The backlight unit 200 may output light to have a dimming intensity determined according to the received control signal.

The processor 111 may transmit a driving signal for outputting a dimming value determined according to a frequency of an image frame to the LED driving circuit 230 of the backlight unit 200.

The LED driving circuit 230 may control the operation of the lamp unit 210 according to the received driving signal.

The backlight block value (dimming value of the backlight block) may be calculated by [Equation 2].

$$\text{(block value by an existing } L/D\text{)}+(\text{Vfrontvrr(max)}/BL(\text{max})-BL(\text{setting}))) \quad \text{[Equation 2]}$$

A block value by an existing L/D may represent a dimming value of a block during conventional local dimming.

Vfrontvrr may be the calculated value of the vertical front porch 520.

Vfrontvrr(max) may be the value of the maximum vertical front porch corresponding to the resolution and Vfontvrr shown in the table 700 of FIG. 7.

BL (setting) is a set dimming value of the backlight unit and may be a settable value based on 8 bits (0 to 255).

BL(max) is the maximum dimming value of the backlight unit and may be expressed as a value of 255 based on 8 bits.

For example, if the calculated value of Vfrontvrr is 1421 and the BL (set) value is 95% (243) during VRR operation in a state where the resolution is 1920×1080 and the refresh rate of the video frame is 120 Hz, the backlight block value may be calculated according to [Equation 2].

The backlight block value may be calculated as 243+(1421/(1705/(255-243)))=243+10=253. 253 be expressed as 99.2% based on 8 bits.

Vfrontvrr(max) may be obtained through the table 700 shown in FIG. 7 by resolution and calculated Vfrontvrr.

The backlight block value according to [Equation 2] may be a value to which luminance compensation is applied according to the calculated Vfrontvrr.

The backlight block value according to [Equation 2] may be an equation used to prevent a rapid change in a luminance value.

A comparison between a method of controlling a dimming value through an existing PWM and a method of controlling a dimming value of a block of the backlight unit 200 using Vfrontvrr according to an embodiment of the present disclosure is as follows.

The PWM control method is a method of adjusting the overall brightness of the screen by adjusting the current supplied to the backlight unit 200 through a PWM signal. Since the PWM method is linked to the user interface screen, real-time control linked to the input image frame is impossible.

The luminance rate of the backlight unit according to the existing PWM method is 90.25%, which is the multiplication of the PWM setting value (95%) and the local dimming value (95%).

The luminance rate of the backlight unit according to the embodiment of the present disclosure is 94.05%, which is the multiplication of the PWM setting value (95%) and the local dimming value (99.2%) calculated in [Equation 2].

That is, compared to the conventional PWM method, when the frequency of an image frame drops to a lower frequency, luminance compensation can be performed better.

Accordingly, even during the VRR operation, a sudden change in luminance does not occur, and thus, a flicker phenomenon can be prevented.

Meanwhile, in the present disclosure, a local dimming value and a block value may be used in the same meaning.

FIG. 8 is a graph for comparing dimming value control according to a conventional PWM method and dimming value control according to an embodiment of the present disclosure.

In FIG. 8, a graph on the left is a graph showing a change in dimming value according to a conventional PWM method, and a graph on the right is a graph showing a process of adjusting a dimming value according to a value of a vertical front porch according to an embodiment of the present disclosure.

In each of the left and right graphs, a horizontal axis represents an average picture level (APL) value of a block of a backlight unit, and a vertical axis represents a dimming value (dimming intensity).

In the case of the conventional PWM method, even if the refresh rate of the image frame is changed, there is no change in the dimming value after a certain APL value.

However, according to an embodiment of the present disclosure, the dimming value may be adjusted according to the refresh rate of the image frame.

When the dimming value is adjusted according to the refresh rate of the image frame, a sudden change in luminance can be prevented. Accordingly, there is an effect that the flicker phenomenon can be greatly improved.

FIG. 9 is a flowchart illustrating a method of controlling luminance of a display device according to another exemplary embodiment of the present disclosure.

Referring to FIG. 9, the processor 111 of the display device 100 receives an image signal (S901) and predicts a refresh rate of the received image signal (S903).

In one embodiment, the processor 111 may receive an image signal from a graphics card. The graphic card may receive the image signal received by the external input interface 110 from an external device and transmit it to the processor 111.

In another embodiment, the processor 111 may receive an image signal through the external input interface 110.

The processor 111 may predict the refresh rate of the received image signal. The processor 111 may predict the refresh rate of the image signal based on the number of lines of the synchronization signal.

For a method of predicting the refresh rate of the image signal, the embodiment of FIG. 3 is borrowed.

The processor 111 determines whether the predicted refresh rate is different from the refresh rate of the previous image signal (S905).

The processor 111 may determine whether the refresh rate of the previous image signal is different from the refresh rate of the current image signal.

The processor 111 may know the refresh rate of the previous image signal in advance. When the VRR function is activated, the refresh rate of the image signal transmitted from the graphic card may be changed.

The processor 111 may check whether the refresh rate of the image signal is changed.

The processor 111 may check whether the refresh rate of the image signal is changed in real time or periodically.

When the predicted refresh rate is different from that of the previous image signal, the processor 111 determines a brightness compensation value of the image signal based on the predicted refresh rate (S907).

When the predicted refresh rate is different from the refresh rate of the previous image signal, the processor 111 may determine a brightness compensation value corresponding to the predicted refresh rate by using a lookup table.

In an embodiment, the lookup table may be a table representing a correspondence between a current refresh rate of an image signal, a changed refresh rate, and a brightness compensation value.

The lookup table may be stored in the processor 111 or may be stored in the memory 170.

When the refresh rate of the image signal is changed, the processor 111 may read a brightness compensation value corresponding to the changed refresh rate from the lookup table.

FIG. 10 is an example of a lookup table showing a correspondence between a brightness compensation value suitable for a refresh rate according to an embodiment of the present disclosure.

In the lookup table, refresh rate is expressed as frequency.

Referring to FIG. 10, the lookup table 1000 shows a correspondence relationship between a resolution/current refresh rate, a changed refresh rate, and a brightness compensation value corresponding to the changed refresh rate.

The brightness compensation value may be different depending on whether the image is a high dynamic range (HDR) image. HDR OFF may indicate a brightness compensation value in case of non-HDR image, and HDR ON may indicate brightness compensation value in case of HDR image.

Resolution information of the image signal may be received together with the image signal.

The processor 111 may obtain the changed refresh rate based on the calculated maximum vertical front porch (MVRR) value using the embodiment of FIG. 3.

The lookup table 1000 of FIG. 10 may be used to read the changed refresh rate.

The processor 111 may first calculate the MVRR value and obtain a changed refresh rate suitable for the MVRR value using the lookup table 1000.

For example, when the current refresh rate of an image signal having a resolution of 1920×1080 is 100 Hz and the MVRR is calculated as 1224, the processor 111 may determine that the refresh rate is changed from 100 Hz to 48 Hz.

The processor 111 may read the brightness compensation value 52 or 62 corresponding to the changed refresh rate of 48 Hz using the lookup table 1000.

The processor 111 may determine a brightness compensation value of 62 when the image is an HDR image, and determine a brightness compensation value of 56 when the image is not an HDR image.

The brightness compensation value may have a value from 0 to 100. The brightness compensation value may be a percentile value displayed on a user interface menu.

As another example, when the current refresh rate of an image signal having a resolution of 2560×1440 is 120 Hz and the MVRR is calculated as 2161, the processor 111 may determine the changed refresh rate as 50 Hz.

The processor 111 may read the brightness compensation value 55 or 60 corresponding to the changed refresh rate of 48 Hz using the lookup table 1000.

The processor 111 may determine a brightness compensation value of 55 when the image is an HDR image, and determine a brightness compensation value of 60 when the image is not an HDR image.

Again, FIG. 9 will be described.

The processor 111 adjusts the gain value of the image signal according to the determined brightness compensation value (S909).

A gain value of the image signal may be an RGB value of pixels constituting the display panel 160.

The gain value of the image signal may be named an offset gain value.

The processor 111 may adjust RGB values of a plurality of pixels constituting the display panel 160 according to the determined brightness compensation value.

RGB values according to brightness compensation values may also be determined through a separate lookup table.

RGB values can have values from 0 to 255 based on 8 bits.

The processor 111 outputs the image signal whose gain value is adjusted to the display panel 160 (S911).

That is, the processor 111 may output an image signal whose brightness is adjusted to the display panel 160. Accordingly, the display panel 160 may display an image having the adjusted brightness.

Figure 11:
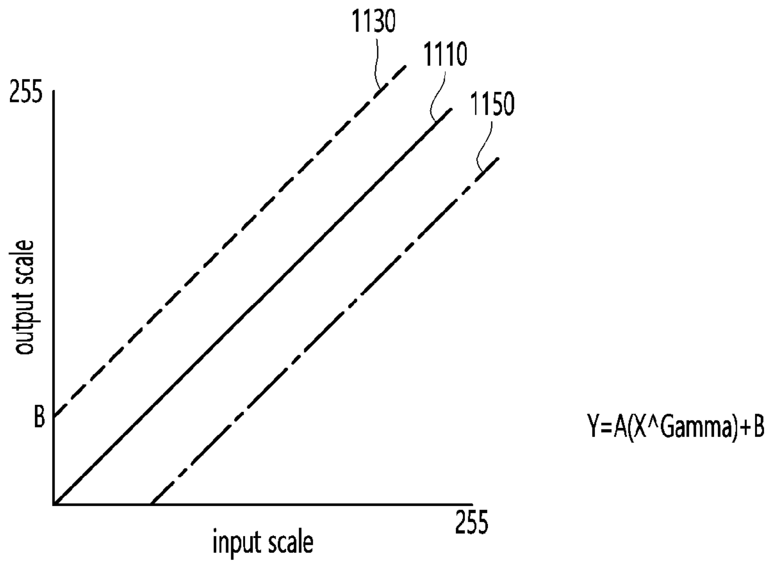
FIG. 11 is a diagram illustrating a process of adjusting the brightness of an image when a change in refresh rate is detected according to an embodiment of the present disclosure.

FIG. 11 is a diagram illustrating a process of adjusting the brightness of an image when a change in refresh rate is detected according to an embodiment of the present disclosure.

Referring to FIG. 11, graphs 1110 to 1130 showing a brightness relationship between an input scale and an output scale are shown.

Each of the X-axis and Y-axis of the graph of FIG. 11 has a value in the range of 0 to 255 based on 8 bits.

The function of each graph can be expressed as Y=A (X^Gamma)+B.

Here, A may be a contrast adjustment gain, and B may be a brightness adjustment gain.

A may be the slope of the graph, and B may be the Y-intercept of the graph.

The contrast adjustment gain may be referred to as a contrast compensation value and the brightness adjustment gain may be referred to as a brightness compensation value.

Gamma is a value representing a correlation between the brightness level of an image signal input to the display panel 160 and the luminance of an image displayed on the screen.

Gamma may be 2.2, but it is only an example.

In an embodiment of the present disclosure, the gamma value is fixed.

That is, the processor 111 may adjust the brightness of the image according to the changed refresh rate while fixing the gamma value.

It is assumed that the B value of the function represented by the first graph 1110 is 0. Also, when B is 0, the brightness compensation value of the lookup table 1000 may correspond to 50.

The processor 111 may change the first graph 1110 into the second graph 1130 when the refresh rate is changed and the brightness compensation value corresponding to the changed refresh rate exceeds 50. That is, the processor 111 may increase the B value.

The processor 111 may change the first graph 1110 into the second graph 1130 when the refresh rate is changed and the brightness compensation value corresponding to the changed refresh rate does not exceed 50. That is, the processor 111 may decrease the B value.

According to another embodiment of the present disclosure, when the refresh rate is changed, the processor 111 may simultaneously adjust the contrast compensation value in addition to the brightness compensation value according to the changed refresh rate.

That is, the processor 111 may simultaneously adjust the slope A and the Y-intercept B of the first graph 1110 when the refresh rate is changed.

To this end, the lookup table 1000 shown in FIG. 10 may further include a contrast compensation value in addition to the brightness compensation value.

The processor 111 may adjust the brightness of the image by adjusting one or more of a contrast compensation value and a brightness compensation value suitable for the changed refresh rate.

As described above, according to an embodiment of the present disclosure, even if the VRR function is activated and the refresh rate of the image signal is changed, at least one of contrast or brightness is adjusted accordingly, and flicker can be reduced.

According to the embodiment of FIG. 2, in the case of controlling the luminance by controlling the backlight unit 200 according to the changed refresh rate, an operation delay of the LED driving circuit 230 may occur to adjust the luminance.

According to the embodiment of the present disclosure, when the change in the refresh rate is large, only the contrast or brightness may be adjusted, so less flicker may occur than the method of adjusting the brightness through the control of the backlight unit 200 (the embodiment of FIG. 2).

Figure 12:
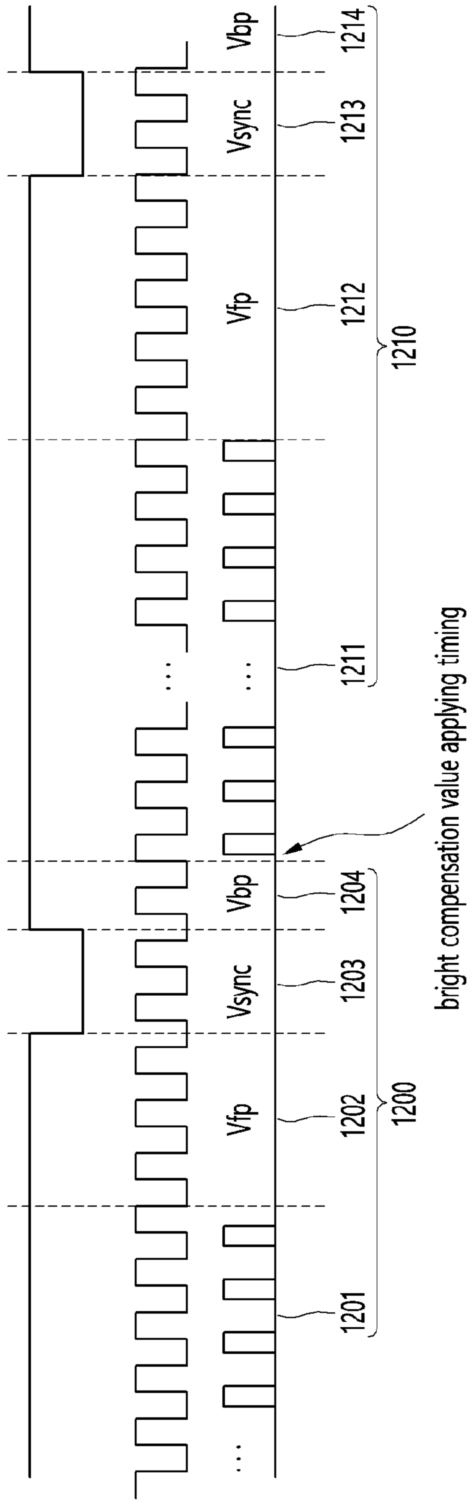
FIG. 12 is a diagram for explaining timing for adjusting a gain value of an image signal according to a change in refresh rate, according to an embodiment of the present disclosure.

FIG. 12 is a diagram for explaining timing for adjusting a gain value of an image signal according to a change in refresh rate, according to an embodiment of the present disclosure.

Referring to FIG. 12, a first image signal or a first video data packet 1200 may include a first vertical active porch 1201, a first vertical front porch 1202, a first vertical sync porch 1203, and a first vertical back porch 1204.

The second image signal or second video data packet 1210 may include a second vertical active porch 1211, a second vertical front porch 1212, a second vertical sync porch 1213, and a second vertical back porch 1214.

Each of the first and second vertical active porches 1201 and 1211 may be a section including data for an actual image displayed on the screen.

Each of the first and second vertical front porches 1202 and 1212 may be a section indicating a standby time after outputting a vertical active porch (or vertical signal). When the VRR function is applied, the vertical front porch can be changed.

Each of the first and second vertical sync porches 1203 and 1213 may be a section for matching a synchronization of the vertical signal.

Each of the first and second vertical back porches 1204 and 1214 may be a section indicating an output standby time of a vertical signal waiting until the next vertical signal is output.

It is assumed that the second image data packet 1210 is a packet that follows the first image data packet 1200, and the refresh rate of the second image data packet 1210 is different from that of the first image data packet 1200. That is, it is assumed that the refresh rate is changed.

The processor 111 may determine the refresh rate of the second image data packet 1200 that follows based on the number of lines of the first vertical front porch 1202.

The processor 111 may determine a refresh rate corresponding to the maximum vertical front porch MVRR, which is the maximum value of the first vertical front porch 1202, using the table of FIG. 7 or 10.

The processor 111 may read a brightness compensation value corresponding to the determined refresh rate of the second image data packet 1210 using the table 1000 of FIG. 10.

The processor 111 may apply the read brightness compensation value to the start time of the second image data packet 1211 as the next packet.

That is, the processor 111 may apply an RGB value suitable for the read brightness compensation value to the second vertical active porch 1211.

The processor 111 may control the brightness compensation value to be reflected in the pixel by applying an RGB data value matching the read brightness compensation value to the pixel.

As described above, according to the exemplary embodiment of the present disclosure, even if the refresh rate of the image signal is changed, the occurrence of flicker can be reduced only by adjusting the brightness without separate control of the backlight unit 200.

Figure 13:
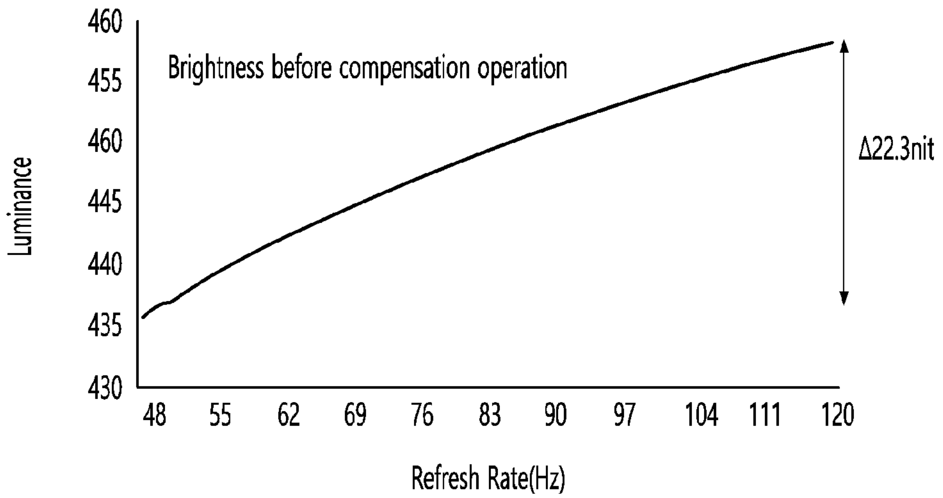
FIG. 13 is a graph showing a change in luminance, compared to a refresh rate, before a brightness compensation operation when a refresh rate of an image signal is changed according to the prior art.
Figure 14:
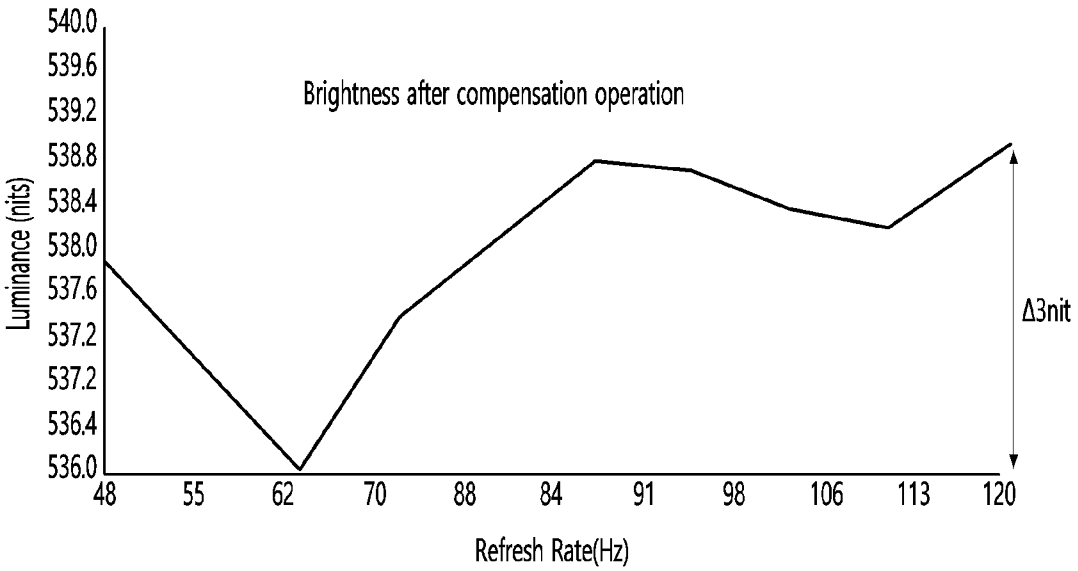
FIG. 14 is a graph showing a change in luminance, compared to a refresh rate before the brightness compensation operation when refresh rate of an image signal is changed according to an exemplary embodiment of the present disclosure.

FIG. 13 is a graph showing a change in luminance, compared to a refresh rate, before a brightness compensation operation when a refresh rate of an image signal is changed according to the prior art, and FIG. 14 is a graph showing a change in luminance, compared to a refresh rate before the brightness compensation operation when refresh rate of an image signal is changed according to an exemplary embodiment of the present disclosure.

The luminance of the LCD display panel can be adjusted by a control method of the backlight unit 200 or by setting the brightness of an image.

When the VRR function is activated with the PWM setting value fixed, when a change in luminance according to a change in the refresh rate is observed, it may be determined that the brightness of the image is adjusted.

The PWM set value may be a luminance control value of the backlight unit set through the user interface screen. Luminance can be set according to the PWM setting value.

FIGS. 13 and 14 assume that the PWM setting value is fixed.

Referring to FIG. 13, when the brightness compensation operation is not performed, as the refresh rate of the image signal changes from 48 Hz to 120 Hz, the luminance changes from a minimum of 435.4 nits to a maximum of 457.7 nits and a change of 22.3 nits is generated.

Referring to FIG. 14, when the brightness compensation operation is performed, as the refresh rate of the image signal is changed from 48 Hz to 120 Hz, the luminance changes from a minimum of 536 nits to a maximum of 539 nits by 3 nits.

That is, according to the embodiment of the present disclosure, even if the refresh rate of the image signal is changed from 48 Hz to 120 Hz, the maximum luminance change is 3 nit, which is much smaller than 22.3 nit of the prior art.

The fact that the change range of luminance is small may mean that the degree of occurrence of flicker is small.

As described above, according to an embodiment of the present disclosure, when the VRR function is activated, the brightness of the image signal is adjusted according to the refresh rate of the image signal, so that the occurrence of flicker can be reduced.

Accordingly, even if the VRR function is activated, the occurrence of flicker is reduced, and the user may not feel inconvenience in viewing the video. In particular, when watching a game video to which the VRR function is mainly applied, discomfort in viewing the video can be reduced.

Figures 15, 16:
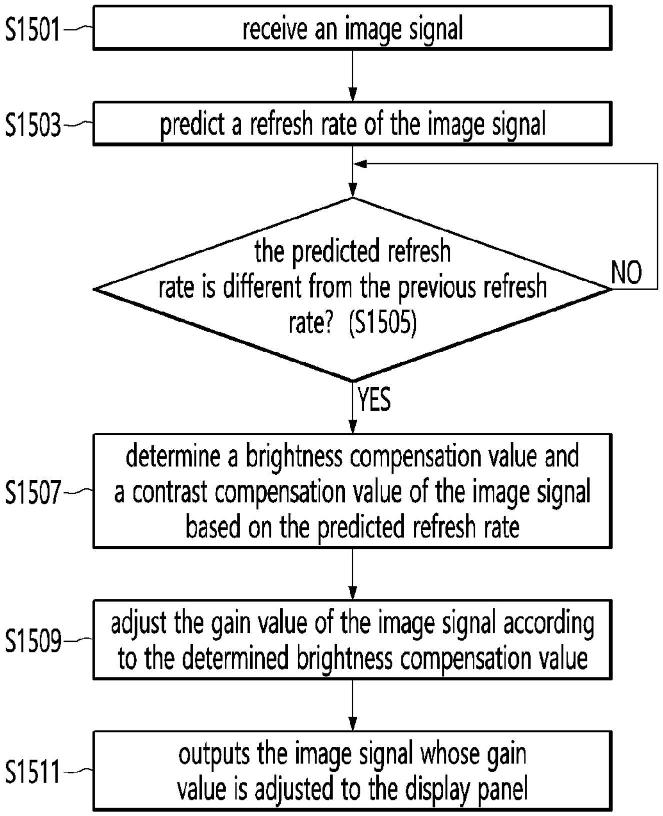
FIG. 15 is a diagram for explaining a luminance control method of a display device according to another embodiment of the present disclosure.
FIG. 16 is an example of a lookup table showing a correspondence between a brightness compensation value and a contrast compensation value suitable for a refresh rate according to an embodiment of the present disclosure.

FIG. 15 is a diagram for explaining a luminance control method of a display device according to another embodiment of the present disclosure.

In particular, compared to the embodiment of FIG. 9, the embodiment of FIG. 15 is an example in which the brightness compensation value and the contrast compensation value are simultaneously adjusted according to the predicted refresh rate.

Among the steps of FIG. 15, detailed description of the same content as the embodiment of FIG. 9 are replaced with those of FIG. 9.

The processor 111 of the display device 100 receives an image signal (S1501) and predicts a refresh rate of the received image signal (S1503).

The processor 111 determines whether the predicted refresh rate is different from the refresh rate of the previous image signal (S1505).

When the predicted refresh rate is different from that of the previous image signal, the processor 111 determines a brightness compensation value and a contrast compensation value of the image signal based on the predicted refresh rate (S1507).

The processor 111 may read a brightness compensation value and a contrast compensation value suitable for the changed refresh rate using a lookup table stored in the memory 170.

This will be described with reference to FIG. 16.

FIG. 16 is an example of a lookup table showing a correspondence between a brightness compensation value and a contrast compensation value suitable for a refresh rate according to an embodiment of the present disclosure.

In the lookup table 1600, the refresh rate is expressed as a frequency.

Referring to FIG. 16, the lookup table 1600 shows a correspondence relationship between resolution/current refresh rate, a changed refresh rate, and a brightness compensation value/contrast compensation value corresponding to the changed refresh rate.

The brightness compensation value and the contrast compensation value may be different depending on whether the image is a high dynamic range (HDR) image, but is omitted in the present embodiment.

Resolution information of the image signal may be received together with the image signal.

The processor 111 may obtain the changed refresh rate based on the calculated maximum vertical front porch (MVRR) value using the embodiment of FIG. 3.

The lookup table 1600 of FIG. 16 may be used to read the changed refresh rate.

The processor 111 may first calculate the MVRR value and obtain a changed refresh rate suitable for the MVRR value by using the lookup table 1600.

For example, when the current refresh rate of an image signal having a resolution of 1920×1080 is 100 Hz and the MVRR is calculated as 1224, the processor 111 may determine that the refresh rate is changed from 100 Hz to 48 Hz.

The processor 111 may read the brightness compensation value 52 and the contrast compensation value 1 corresponding to the changed refresh rate of 48 Hz using the lookup table 1600

As another example, when the current refresh rate of an image signal having a resolution of 1920×1080 is 120 Hz and the MVRR is calculated as 1635, the processor 111 may determine the changed refresh rate as 49 Hz.

The processor 111 may read the brightness compensation value 55 and the contrast compensation value 2 corresponding to the changed refresh rate of 49 Hz using the lookup table 1600.

Again, FIG. 15 will be described.

The processor 111 adjusts the gain value of the image signal according to the determined brightness compensation value and contrast compensation value (S1509).

A gain value of the image signal may be an RGB value of a pixel constituting the display panel 160.

A gain value of the image signal may be an RGB data value applied to pixels constituting the display panel 160.

The processor 111 may adjust RGB values of a plurality of pixels according to the determined brightness compensation value and contrast compensation value.

The processor 111 may apply an RGB data value suitable for the determined brightness compensation value and contrast compensation value to each pixel.

RGB data value suitable for the brightness compensation value and the contrast compensation value may also be determined through a separate lookup table.

The processor 111 outputs the image signal whose gain value is adjusted to the display panel 160 (S1511).

According to an embodiment of the present disclosure, during VRR operation, the occurrence of flicker can be reduced only by adjusting the brightness of an image without adjusting a gamma value.

The present disclosure described above can be implemented as computer readable codes in a medium on which a program is recorded. A computer-readable medium includes all types of recording devices in which data that can be read by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc. there is Also, the computer may include the controller 170 of the display device 100.

The invention claimed is:

1. A display device comprising:

a display panel including a plurality of pixels;

a backlight unit configured to provide a light to the display panel; and a processor is configured to:

when a refresh rate of the image signal is changed, obtain a brightness compensation value suitable for the changed refresh rate, and apply a RGB data value suitable for the obtained brightness compensation value to each pixel, wherein if the brightness compensation value of the image signal is not changed, in a state in which a luminance control value of the backlight unit is fixed, a first luminance change range measured according to the change of the refresh rate is larger than a second luminance change range, if the brightness compensation value of the image signal is changed in a state in which the luminance control value of the backlight unit is fixed, the second luminance change range is measured according to the change of the refresh rate.

2. The display device of claim 1, wherein each of the first and second luminance change ranges is a difference between a minimum luminance value and a maximum luminance value within a change range of the refresh rate.

3. The display device of claim 1, further comprising:

a memory configured to store a lookup table for storing a correspondence between a current refresh rate, a changed refresh rate, and the brightness compensation value, wherein the processor is further configured to read the brightness compensation value suitable for the changed refresh rate from the lookup table.

4. The display device of claim 1, wherein the processor is further configured to:

acquire a contrast compensation value matching the changed refresh rate, and apply the brightness compensation value and the RGB data value matching the contrast compensation value to each pixel.

5. The display device of claim 4, further comprising:

a memory configured to store a lookup table for storing a correspondence between a current refresh rate, a changed refresh rate, the brightness compensation value, and the contrast compensation value, wherein the processor is further configured to read the brightness compensation value and the contrast compensation value suitable for the changed refresh rate from the lookup table.

6. The display device of claim 1, wherein the processor is further configured to:

calculate a vertical front porch value constituting the image signal, and determine the refresh rate of the image signal using the calculated vertical front porch value.

7. The display device of claim 6, further comprising:

a memory configured to store a table representing a correspondence between a resolution, a value of a maximum vertical front porch, and a refresh rate, wherein the processor is configured to determine the refresh rate of the image signal that matches the calculated value of the vertical front porch using the table.

8. A method of operating a display device including a display panel including a plurality of pixels and a backlight unit providing a light to the display panel, comprising:

receiving an image signal;

determining whether a refresh rate of the image signal is changed;

obtaining a brightness compensation value suitable for the changed refresh rate when the refresh rate is changed; and applying a RGB data value that matches the obtained brightness compensation value to each pixel, wherein if the brightness compensation value of the image signal is not changed, in a state in which a luminance control value of the backlight unit is fixed, a first luminance change range measured according to the change of the refresh rate is larger than a second luminance change range, if the brightness compensation value of the image signal is changed in a state in which the luminance control value of the backlight unit is fixed, the second luminance change range is measured according to the change of the refresh rate.

9. The method of claim 8, wherein each of the first and second luminance change ranges is a difference between a minimum luminance value and a maximum luminance value within a change range of the refresh rate.

10. The method of claim 8, wherein the display device further comprises a memory configured to store a lookup table for storing a correspondence between a current refresh rate, a changed refresh rate, and the brightness compensation value, wherein the method further comprises:

reading the brightness compensation value suitable for the changed refresh rate from the lookup table.

11. The method of claim 8, further comprising:

acquiring a contrast compensation value suitable for the changed refresh rate, wherein the step of applying comprises applying the brightness compensation value and the RGB data value matching the contrast compensation value to each pixel.

12. The method of claim 11, wherein the display device further comprises:

a memory configured to store a lookup table for storing a correspondence between a current refresh rate, a changed refresh rate, the brightness compensation value, and the contrast compensation value, wherein the obtaining the brightness compensation value and the contrast compensation value comprises:

reading the brightness compensation value and the contrast compensation value suitable for the changed refresh rate from the lookup table.

13. The method of claim 8, further comprising:

calculating a vertical front porch value constituting the image signal; and determining the refresh rate of the image signal using the calculated vertical front porch value.

14. The method of claim 13, wherein the display device further comprising a memory configured to store a table representing a correspondence between a resolution, a value of a maximum vertical front porch, and a refresh rate, wherein the determining the refresh rate of the image signal step comprises:

determining the refresh rate of the image signal that matches the calculated value of the vertical front porch using the table.

* * * * *